(12) United States Patent
Marando et al.

(10) Patent No.: US 6,919,703 B2
(45) Date of Patent: Jul. 19, 2005

(54) PROGRAMMABLE PWM STRETCHING FOR TACHOMETER MEASUREMENT

(75) Inventors: Eileen M. Marando, Bellmore, NY (US); Robert W. Schoepflin, Port Jefferson, NY (US); Richard E. Wahler, St. James, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 218 days.

(21) Appl. No.: 10/459,169

(22) Filed: Jun. 11, 2003

(65) Prior Publication Data

US 2004/0257024 A1 Dec. 23, 2004

(51) Int. Cl.$^7$ .............................................. G05B 11/28
(52) U.S. Cl. ...................................... 318/599; 318/600
(58) Field of Search ................................ 318/599, 600, 318/569, 811

(56) References Cited

U.S. PATENT DOCUMENTS

| | | | |
|---|---|---|---|
| 4,722,669 A | 2/1988 | Kundert | |
| 4,727,468 A | 2/1988 | Maekawa | |
| 5,249,741 A | 10/1993 | Bistline et al. | |
| 5,307,439 A | 4/1994 | Enami | |
| 5,687,079 A | 11/1997 | Bauer et al. | |
| 5,727,928 A | 3/1998 | Brown | |
| 5,825,972 A | 10/1998 | Brown | |
| 5,942,866 A | 8/1999 | Hsieh | |
| 5,962,933 A | 10/1999 | Henderson et al. | |
| 5,990,582 A | 11/1999 | Henderson et al. | |
| 6,182,902 B1 | 2/2001 | Shih | |
| 6,188,189 B1 | 2/2001 | Blake | |
| 6,208,538 B1 | 3/2001 | Halamik et al. | |
| 6,226,324 B1 | 5/2001 | Allstrom | |
| 6,247,898 B1 | 6/2001 | Henderson et al. | |
| 6,262,549 B1 | 7/2001 | Yang et al. | |
| 6,519,167 B1 | 2/2003 | Nguyen | |
| 6,528,987 B1 | 3/2003 | Blake et al. | |
| 6,563,284 B2 | 5/2003 | Teutsch et al. | |
| 6,601,168 B1 | 7/2003 | Stancil et al. | |
| 6,650,074 B1 | 11/2003 | Vyssotski et al. | |
| 6,661,679 B1 | 12/2003 | Yang et al. | |
| 2003/0146041 A1 * | 8/2003 | Kanda ........................ 180/446 |
| 2003/0154041 A1 * | 8/2003 | McGaughey et al. ......... 702/75 |
| 2003/0193307 A1 | 10/2003 | Burstein | |
| 2004/0001542 A1 | 1/2004 | Miller, Jr. | |

OTHER PUBLICATIONS

Analog Devices, Publication ADM1027, "*dB*COOL™ Remote Thermal Controller and Voltage Monitor," 2003, 56 pages.

National Semiconductor Corporation, Publication LM63, "±1° C Accurate Remote Diode Digital Temperature Sensor with Integrated Fan Control," Feb. 2003, 28 pages.

Stephen Ohr, "Analog IC vendors find 'Intel Inside' a safe bet," Sep. 12, 2002, online at http://www.eetimes.com/story/OEG20020912S0026.

* cited by examiner

*Primary Examiner*—Karen Masih
(74) *Attorney, Agent, or Firm*—Meyertons Hood Kivlin Kowert & Goetzel, PC; Jeffrey C Hood (57) ABSTRACT

A system may include a tachometer reading unit and a PWM (Pulse Width Modulated) signal generator configured to generate a PWM signal. The tachometer reading unit may be configured to obtain a tachometer reading from a tachometer signal generated by a device powered by the PWM signal. The tachometer reading unit includes a register configured to store a value indicative of a maximum stretching duration. The tachometer reading unit is configured to update the register in response to receiving a new value of the maximum stretching duration. The tachometer reading unit may be configured to control the PWM signal generator to stretch a pulse in the PWM signal and to not stretch the pulse longer than the maximum stretching duration indicated by the register. The tachometer reading unit is configured to obtain the tachometer reading during the stretched pulse in the PWM signal.

27 Claims, 4 Drawing Sheets

PROGRAMMABLE PWM STRETCHING FOR TACHOMETER MEASUREMENT

BACKGROUND OF THE INVENTION

1. Field of the Invention

This invention relates to fans, and more particularly, to measuring the rotational speed of a fan.

2. Description of the Related Art

Fans are often used to evacuate warm air from enclosures in which electronic systems are contained. For example, most computer systems include at least one fan to aid in system cooling. The increased airflow provided by fans aids in eliminating waste heat that may otherwise build up and adversely affect system operation.

Control of fans in a system typically involves a fan control unit executing a fan control algorithm. A fan control algorithm may determine the method for controlling one or more fans that are configured to evacuate warm air from a system enclosure. For example, the fan control algorithm may specify that a fan's speed should be increased or decreased dependent upon a detected temperature. Such control algorithms may also involve turning off a fan if the temperature is deemed cool enough to do so.

Fans often include a tachometer output that provides a signal indicative of the current speed of the fan. The tachometer signal may be used to determine whether the fan is operating properly. Often, fans used for CPU and/or computer system cooling have a three-wire interface with wires for power, ground, and the tachometer signal. Fan drive systems often use a PWM (Pulse Width Modulated) signal generator to drive an external circuit that controls the voltage between the power and ground interfaces of the fan, which in turn controls the speed of the fan. PWMs are useful because they provide a digital control for the pulse width of a signal. The fan is turned on for the duration of the pulse and turned off between pulses. The duty cycle of the pulse train currently being provided to the fan determines the fan's speed.

One problem that results from using PWMs to drive fan circuits is that the fan is not powered for a fixed amount of time between each pulse. During this time, the tachometer circuitry associated with the fan does not receive power. As a result, the tachometer signal output by the fan may not accurately represent the current fan speed during the time between pulses. Similarly, when the fan is turned off, the tachometer signal does not indicate the speed of the fan as the fan spins down. One technique that is currently used to measure fan speed in these situations involves using an analog filtering system to measure the back EMF (Electromotive Force) inserted into the fan tachometer signal by the rotating fan. However, it is desirable to be able to accurately detect fan speed using a digital technique.

SUMMARY

Various embodiments of systems and methods of implementing programmable PWM stretching are disclosed. In some embodiments, a system may include a tachometer reading unit and a PWM signal generator configured to generate a PWM signal. The tachometer reading unit may be configured to obtain a tachometer reading from a tachometer signal generated by a device powered by the PWM signal. The tachometer reading unit also includes a register configured to store a value indicative of a maximum stretching duration. The tachometer reading unit is configured to update the register in response to receiving a new value of the maximum stretching duration. The tachometer reading unit may be configured to control the PWM signal generator to stretch a pulse in the PWM signal and to not stretch the pulse longer than the maximum stretching duration indicated by the register. The tachometer reading unit is configured to obtain the tachometer reading during the stretched pulse in the PWM signal In one embodiment, the tachometer reading unit may control the PWM signal generator to stretch a pulse in the PWM signal until the earliest of: detection of N edges in the tachometer signal or expiration of a maximum stretching duration. The tachometer reading unit may also be configured to update the value of N in response to receiving a new value of N. The tachometer reading unit may be configured to stretch the pulse in the PWM signal in response to the tachometer reading unit detecting fewer than N edges of the tachometer signal during an unstretched pulse in the PWM signal.

In some embodiments, the tachometer reading unit may be configured to detect the speed of the device by counting clock pulses between particular ones of the N edges in the tachometer signal.

In response to the PWM signal transitioning to a signal level that powers the device, the tachometer reading unit may be configured to wait for a guard time to expire before detecting an edge in the tachometer signal. The tachometer reading unit may ignore the first X edges in the tachometer signal after expiration of the guard time. The tachometer reading unit may update the tachometer register in response to detecting N edges in the tachometer signal subsequent to detecting the first X edges in the tachometer signal. The tachometer reading unit may also be configured to update a value of the guard time in response to receiving a new value of the guard time.

The tachometer reading unit may be configured to operate in one mode if the device is constantly powered and to operate in a different mode if the device is powered by the PWM signal and the PWM signal has a duty cycle less than 100%. When in the second mode, the tachometer reading unit may be configured to not detect edges in the tachometer signal while the device is not powered.

If the maximum stretching duration expires before the tachometer reading unit detects any edges in the tachometer signal, the tachometer reading unit may update a status register to indicate that the device is stalled. Similarly, if the maximum stretching duration expires after the tachometer reading unit detects at least one edge in the tachometer signal but before the tachometer reading unit detects N edges in the tachometer signal, the tachometer reading unit may update the status register to indicate that the device is slow.

If PWM stretching is disabled, the tachometer reading unit may be configured to not stretch the pulse in the PWM signal. The tachometer reading unit may be configured to update a PWM stretching register to indicate that PWM stretching is enabled in response to receiving a new value of the PWM stretching register.

One embodiment of a method may involve: storing a value indicative of a maximum stretching duration; generating a PWM signal to power a device; stretching a pulse in the PWM signal, where the stretching ends if the maximum stretching duration indicated by the value elapses; in response to stretching the PWM pulse, obtaining a tachometer reading from a tachometer signal generated by the device; and updating the value to indicate a new maximum stretching duration.

BRIEF DESCRIPTION OF THE DRAWINGS

Other aspects of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF EMBODIMENTS

Figure 1:
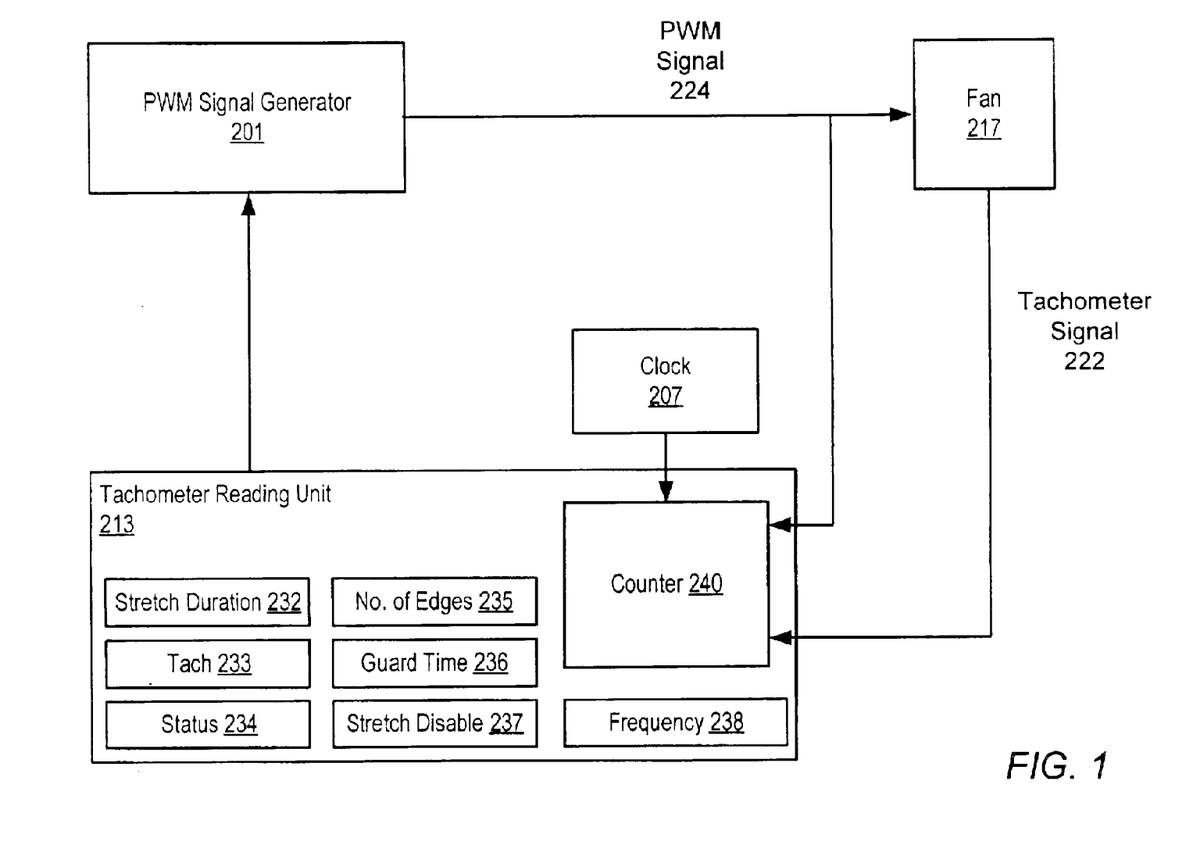
FIG. 1 is a block diagram of a system for detecting the speed of a fan, according to one embodiment.

FIG. 1 shows a system for detecting the speed of the fan, according to one embodiment. In this embodiment, a fan 217 receives a PWM signal from a PWM (Pulse Width Modulated) signal generator 201. The fan 217 also generates a tachometer signal 222, which is received by a tachometer reading circuit 213. The tachometer reading unit 213 may provide a control signal to the PWM signal generator 201 in order to perform PWM pulse stretching. As used herein, a tachometer reading unit is any component operable to obtain a tachometer reading from a device powered by a PWM signal. Note that the tachometer reading unit 213 and PWM signal generator 201 may be used to respectively measure the speed of and power devices other than fans in other embodiments.

The PWM signal generator 201 generates the PWM signal that powers the fan 217. The PWM signal may be an active-high or an active-low signal. The PWM signal generator 201 may generate the PWM signal to have a variable duty cycle (e.g., dependent on the current temperature of the area which the fan is cooling). The duty cycle of the PWM signal is the ratio of the time in which the PWM signal is asserted to the time in which the PWM signal is deasserted. Modifying the duty cycle of the PWM signal modifies the speed of the fan 217. As the duty cycle increases, the fan 217 is powered for a greater percentage of time each cycle. Consequentially, the fan speed increases. Similarly, as the duty cycle decreases, the fan speed decreases. In one embodiment, the duty cycle of the PWM signal may be digitally programmed into the PWM generator. The PWM signal generator 201 may include a register or memory that stores a digital value that controls the current pulse width. The PWM signal generator 201 may be configured to update this digital value in response to receiving a new duty cycle value. This value may represent the minimum duration of each pulse in the PWM signal.

In some embodiments, the PWM signal may be input to fan drive circuitry (not shown) that controls when the fan is powered (as opposed to being directly input to the fan 217, as shown in FIG. 1). For example, in one embodiment, fan drive circuitry may include a transistor coupled between a ground interface of the fan 217 and ground and configured to turn on in response to a pulse in the PWM signal. When the transistor is turned on, the transistor electrically connects the ground interface of the fan to ground; otherwise, the transistor creates an open circuit between the ground interface of the fan and ground. Alternatively, fan drive circuitry may include a transistor configured to electrically connect the power interface of the fan to a power source when the transistor is turned on. Other types of fan drive circuitry may also be used.

When the fan 217 is powered, the fan 217 may generate a tachometer signal 222 indicative of the fan's speed. The tachometer signal may pulse N times each rotation of the fan (different types of fans may implement different numbers of pulses per revolution). For example, the tachometer signal may be generated as a digital pulse train in which there are two 50% duty cycle pulses for each rotation of the fan. When the fan is not powered, circuitry (not shown) inside the fan 217 that generates the tachometer signal may be disabled. Accordingly, the tachometer signal may be inaccurate during times in which the fan is not powered.

Tachometer reading circuit 213 may use the tachometer signal 222 to detect the speed of the fan 217 (e.g., by measuring the time between pulses). The speed of the fan may be used to determine how to control the fan 217. For example, the actual speed, as indicated by the tachometer signal, may be compared to an expected fan speed to determine whether the fan is operating properly. The tachometer reading circuit 213 may detect the speed of the fan and store a value indicative of the fan speed in a tachometer register (Tach) 233.

In some embodiments, tachometer reading circuit 213 may detect the speed of the fan by using counter 240 to count the number of clock pulses of a known frequency generated by clock 207 that occur between particular edges of the tachometer signal. The counter 240 may begin counting in response to an edge in the tachometer signal that occurs during a pulse in the PWM signal 224 and continue counting until an Nth edge in the tachometer signal. The total count in counter 240 may then be used to obtain the speed of the fan 217 and a value indicative of the speed (this value may be the count itself) stored in tachometer register 233. Note that other embodiments may obtain tachometer readings from the tachometer signal in other ways.

Since the tachometer signal may be inaccurate during times at which the fan 217 is not powered, the tachometer reading circuit 213 may be configured to only look for edges in the tachometer signal during pulses in the PWM signal. In the illustrated embodiment, this is implemented by inputting the PWM signal 224 to the counter 240. The counter 240 may be configured to only begin counting in response to an edge in the tachometer signal 222 detected during a pulse in the PWM signal 224.

For some PWM signal duty cycles and frequencies, the length of time that the PWM signal is asserted (and thus powering the fan) may be short enough that no valid portion of the tachometer signal contains at least N edges. In these circumstances, the tachometer reading circuit 213 may be configured to implement PWM stretching in order to obtain a valid tachometer reading.

In some embodiments, the tachometer reading unit 213 may be configured to operate in one mode if the fan 217 is constantly powered and to operate in a different mode if the fan 217 is powered by the PWM signal with a duty cycle of less than 100%. In the first mode, the tachometer reading unit 213 may take tachometer readings at any time. In the second mode, the tachometer reading unit 213 may be configured to not detect edges in the tachometer signal while the fan 217 is not powered (e.g., between pulses in the PWM signal).

In order to be able to detect the speed of the fan 217 when the fan 217 is not powered (e.g., when the PWM signal generated by PWM signal generator 201 is low in this embodiment), the tachometer reading unit 213 may control the PWM signal generator 201 to stretch the length of a pulse in the PWM. In other words, the tachometer reading unit 213 may provide control signal(s) to PWM signal generator 201 that temporarily (e.g., for one pulse) increase the duty cycle of the PWM signal 224. For example, the tachometer reading unit 213 may stretch the PWM signal pulse by writing a new, larger duty cycle value to the PWM signal generator 201 or by asserting a signal to the PWM signal generator 201 before and/or during a PWM pulse that causes the PWM signal generator 201 to maintain the pulse until the tachometer reading unit 213 deasserts the signal. The tachometer reading circuit 213 may control the PWM signal generator 201 to implement pulse stretching in other ways in other embodiments.

Various control registers within the tachometer reading unit 213 may control how, if, and when the tachometer reading unit 213 performs PWM stretching. A stretch disable register 237 may control whether the tachometer reading unit 213 performs any PWM stretching. If the value of the register 237 is set to a value indicating that PWM stretching is disabled, the tachometer reading unit 213 may not perform PWM stretching, even if unit 213 is unable to otherwise obtain a valid tachometer reading. If the value of the stretch disable register 237 indicates that PWM stretching is enabled, the tachometer reading unit 213 may perform PWM stretching if needed to obtain a valid tachometer reading. Note that in some embodiments, even if PWM stretching is enabled, the tachometer reading unit 213 may not perform PWM stretching unless needed to obtain a valid tachometer reading.

Another register 235 may store a value indicating the number N of edges to detect in the tachometer signal 222 to obtain a tachometer reading. The number N may be programmed into the tachometer reading circuit depending on the particular type of fan 217 currently coupled to the tachometer reading circuit 213. In one embodiment, this register 235 may be programmable to store any of the following values: 2, 3, 5, or 9 edges. In alternative embodiments, a register may store the number of pulses in the tachometer signal to use to obtain a valid tachometer reading.

A stretch duration register 232 contains a value that indicates the maximum amount of time to stretch a PWM pulse. In one embodiment, this value may indicate the maximum length of a PWM pulse, inclusive of the normal duty cycle pulse. In other embodiments, this value may indicate the maximum length of time that a PWM pulse can be stretched, beginning just after the pulse would normally end according to the normal (un-stretched) duty cycle. The value in the stretch duration register 232 may indicate the maximum time in milliseconds (ms) in some embodiments. In one embodiment, the stretch duration register 232 may be programmable to store any of the following values: 50 ms, 100 ms, 200 ms, 400 ms, 600 ms, 800 ms, and 950 ms. Note that the value in stretch duration register 232 may indicate the maximum length of a pulse in the PWM signal, while another register included in PWM generator 201 may store a value that indicates the minimum length of each pulse in the PWM signal.

One or more guard time registers 236 may indicate the length of a guard time to be used when determining when the tachometer signal is valid relative to a PWM pulse. For example, the tachometer signal may not be guaranteed to be valid until a short time after the first edge in a PWM pulse. The guard time register 236 may indicate how long the tachometer reading unit 213 should wait after the first edge of a PWM pulse before attempting to detect a valid edge in the tachometer signal. Similarly, the tachometer signal may not be guaranteed to be valid just before the edge ending the PWM pulse. Another guard time value may indicate the length of this time. Thus, in one embodiment, separate registers 236 may be used to store each guard time and each guard time may be updated to have a new value. In other embodiments, the second guard time (the guard time before the ending edge in the PWM pulse) may have a static value of zero. In embodiments using counter 240, the counter 240 may be configured to track the initial guard time (the guard time beginning at the first edge in the PWM pulse), the duration of which is indicated in the guard time register 236, and to wait to begin detecting valid edges in the tachometer signal until expiration of the guard time.

A status register 234 may be updated by the tachometer reading circuit 213 to indicate whether the fan is running properly. For example, the value of the status register 234 may indicate whether the fan is running at the expected speed or whether the fan is stalled or running too slowly. In response to obtaining a tachometer reading, the tachometer reading circuit 213 may update the status register 234.

A frequency register 238 may indicate how often the tachometer reading unit 213 should attempt to obtain a tachometer reading, and thus how often PWM stretching should be performed (if stretching is needed to obtain a valid tachometer reading). For example, the frequency register 238 may be set to a value indicating that two tachometer readings should be attempted per second.

The tachometer reading unit 213 may be configured to update values in registers 232, 235, 236, 237, and 238 in response to receiving new values for those registers from another component. For example, the tachometer reading unit 213 may be part of an integrated circuit to be included on a motherboard. The integrated circuit may have inputs to receive register write commands via a bus coupling the integrated circuit to other integrated circuits (e.g., a microprocessor) on the motherboard. Whenever such a register write command is received, the tachometer reading unit 213 may responsively update the appropriate register and adjust its behavior in accordance with the new value of the register. Thus, if the maximum duration indicated in stretch duration register 232 is updated, the tachometer reading unit 213 may subsequently perform pulse stretching such that the new maximum duration is not exceeded. Similarly, if pulse stretching is disabled via a write to stretch disable register 237, the tachometer reading unit 213 may responsively stop performing PWM pulse stretching.

In many embodiments, at least a portion of the system shown in FIG. 1 (with the exception of fan 217) may be implemented as an integrated circuit. For example, in one embodiment, the PWM signal generator 201 and tachometer reading unit 213 may be implemented as an integrated circuit.

Figure 2:
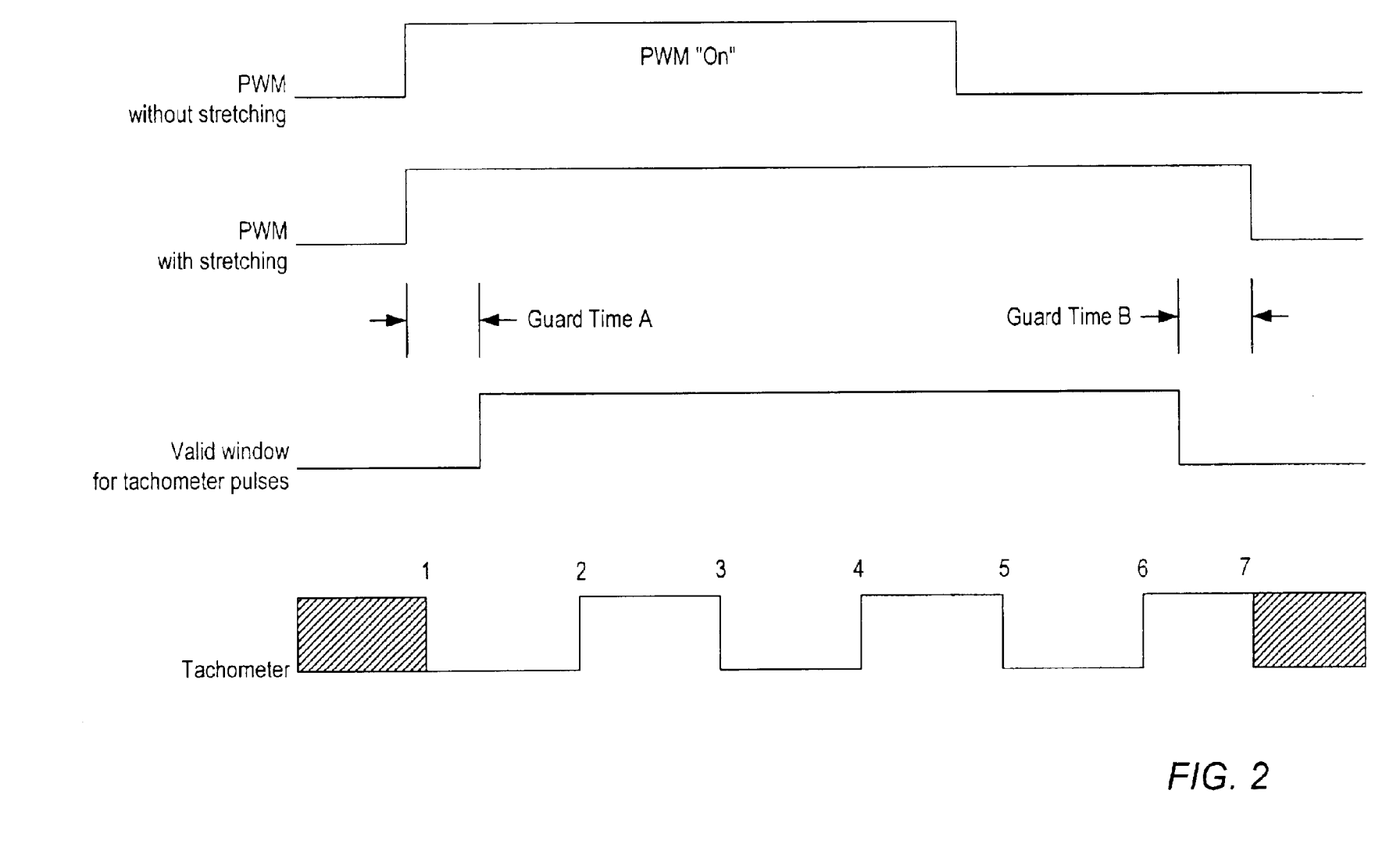
FIG. 2 a timing diagram of exemplary signals that may be generated in a system for detecting the speed of a fan, according to one embodiment.

FIG. 2 shows a timing diagram of exemplary signals that may be generated in one embodiment of a system for detecting the speed of a fan. In this example, both stretched and un-stretched versions of the PWM signal 222 are shown for comparison purposes. The tachometer signal 224 is also shown.

The duration of the stretched PWM pulse is significantly longer than the duration of the un-stretched PWM pulse. The duration of the stretched PWM pulse may be determined by the detection of edges in the tachometer signal and/or by the maximum stretch duration value programmed into the tachometer reading circuit (as shown in FIG. 1).

After a rising edge in the PWM signal, there may be a delay before the tachometer signal is guaranteed to be valid. This delay is shown as guard time A in FIG. 2. Similarly, there may be a period, labeled guard time B, just before the edge in the PWM signal at the end of the pulse in which the tachometer signal may not be guaranteed to be valid. In some embodiments, guard time B may be set equal to zero or to a substantially smaller value than guard time A. Note also that in some embodiments, either or both guard time A and guard time B may be equal to zero.

Between the end of guard time A and the beginning of guard time B, there is a window for detecting valid tachometer pulses. During this window, the tachometer reading unit 213 may detect and respond to (by generating a tachometer reading) the tachometer signal, which is shown at the bottom of FIG. 2.

The value of the tachometer signal is indeterminate before and after the pulse in the stretched PWM signal, as indicated by the shaded areas in FIG. 2. During guard time A, an edge is detected in the tachometer signal. However, during the guard time, the tachometer signal is still considered unreliable, and thus this edge may not be used in generating a tachometer measurement. Edges 2–6 are detected during the valid window for tachometer pulses.

In this example, the tachometer reading unit 213 may be configured to stretch a pulse in the PWM signal in order to obtain a tachometer reading based on five edges (e.g., edges 2–6) in the tachometer signal. As shown, the un-stretched PWM signal only allows for the detection of three edges (taking guard times into account). The tachometer reading unit 213 may be configured to initially try to obtain a valid tachometer reading without performing pulse-stretching. In response to only being able to detect three valid edges in the tachometer signal without pulse-stretching, the tachometer reading unit 213 may begin performing pulse-stretching. As shown in FIG. 2, the tachometer reading unit 213 may stretch a PWM signal pulse at least long enough to detect five edges in the signal (assuming that five edges are detected before expiration of the maximum stretching duration).

During the valid window, the tachometer reading unit 213 may begin counting in response to a clock signal in response to the first edge in the tachometer signal (edge 2 in FIG. 2) and continue counting until the first of: detection of the fifth edge (edge 6 in FIG. 2) in the tachometer signal or the end of the valid window. In some embodiments, the tachometer reading unit 213 may be configured to ignore the first X edges in the tachometer signal after the guard period before beginning to take a tachometer reading. For example, the tachometer reading unit 213 may ignore the first three edges and begin counting clock pulses in response to the fourth edge detected during the valid window of the tachometer signal. The value of X may be programmable.

Note that PWM pulse stretching temporarily affects the duty cycle of the PWM signal, which may in turn increase the speed of the fan or other device powered by the PWM signal and/or the noise generated by the fan or other device. A user or program controlling the tachometer reading register 213 may select the maximum length of time to stretch a PWM pulse in order to balance the need to obtain a valid tachometer reading with the desire to maintain a particular fan speed and/or noise level. By providing a programmable maximum stretching duration register, the same tachometer reading unit 213 may be used with various different types of devices (such as fan 217) while at the same time supporting customized PWM stretching for each different type of device.

Figure 3:
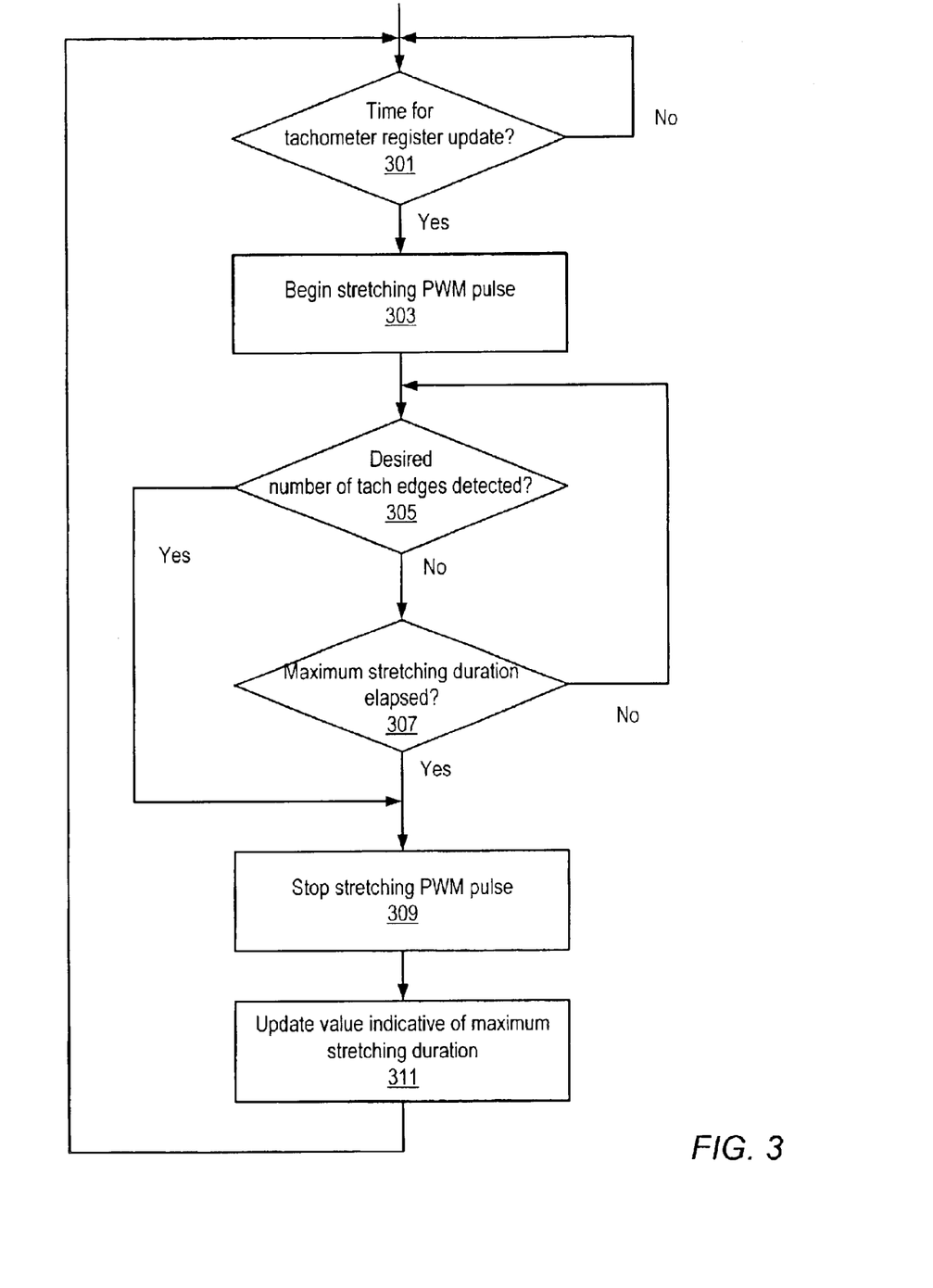
FIG. 3 shows a flowchart of a method of performing PWM stretching in which the maximum stretching duration is programmable, according to one embodiment.

FIG. 3 shows a flowchart of a method of performing PWM stretching in which the maximum stretching duration is programmable, according to one embodiment. Initially, the maximum PWM stretching duration may be set to a default value or to a value initially programmed by a user. The maximum PWM stretching duration value may be selected based on criteria such as the type of fan or device whose tachometer is being monitored, the number of edges to detect in the tachometer signal for a valid tachometer reading, the current operating conditions of the fan, the frequency of tachometer readings.

At 301, if it is time for a tachometer register update (e.g., as determined in response to a value in a frequency register controlling how often tachometer readings are obtained), PWM pulse stretching may be initiated, as indicated at 303. PWM pulse stretching involves increasing the duration of a pulse in the PWM signal. In many embodiments, initiating the PWM pulse stretching at 303 may involve waiting for the first edge of the next pulse in the PWM signal that occurs after the need for a new tachometer register update is detected at 301. This next pulse may then be stretched according to a programmed maximum PWM stretching duration. During the stretched PWM pulse, the device powered by the PWM may generate a valid tachometer signal (e.g., in between guard periods defined relative to edges in the PWM pulse).

During the duration of the stretched PWM pulse in which the tachometer signal is valid, the tachometer reading unit may look for N edges in the tachometer signal. For example, the tachometer reading unit may begin counting clock pulses in response to the first edge in the valid tachometer signal and continue counting until the Nth edge in the tachometer signal or until the maximum PWM stretching duration expires. If the desired number N of tachometer edges is detected during the stretched PWM pulse, the tachometer reading unit may stop stretching the PWM pulse, as shown at 305 and 309. If at 309 the PWM pulse has not yet lasted for its normal, un-stretched duration, the PWM pulse may continue until its normal duration elapses. For example, if the normal PWM duty cycle, without stretching, is an 80% duty cycle and the desired number N of edges is detected (at 305) after a duration of the pulse corresponding to a 40% duty cycle, performance of function 309 may involve allowing the pulse to continue until its normal duration corresponding to an 80% duty cycle elapses without unnecessarily stretching the pulse beyond its normal duration.

If the desired number N of edges in the tachometer signal is not detected before the maximum stretching duration elapses, the tachometer reading unit may stop stretching the PWM pulse, as indicated at 307 and 309.

Note that the order of the functions shown in FIG. 3 may vary among embodiments. For example, in one embodiment, a tachometer reading unit may initially be set to a default maximum PWM stretching value. That tachometer reading unit may be installed in a system and, based on the system's characteristics, the tachometer reading unit may be programmed with a new maximum PWM stretching value before the tachometer reading unit performs any PWM measurements (e.g., function 311 may happen before functions 301–309). In some embodiments, the maximum PWM stretching value may be updated fairly frequently during operation of the tachometer reading unit (e.g., in response to changes in PWM frequency and/or duty cycle), while in other embodiments, the maximum PWM stretching value may be updated relatively infrequently (e.g., whenever system hardware, such as a fan that generates the tachometer signal, is replaced or modified).

Figure 4:
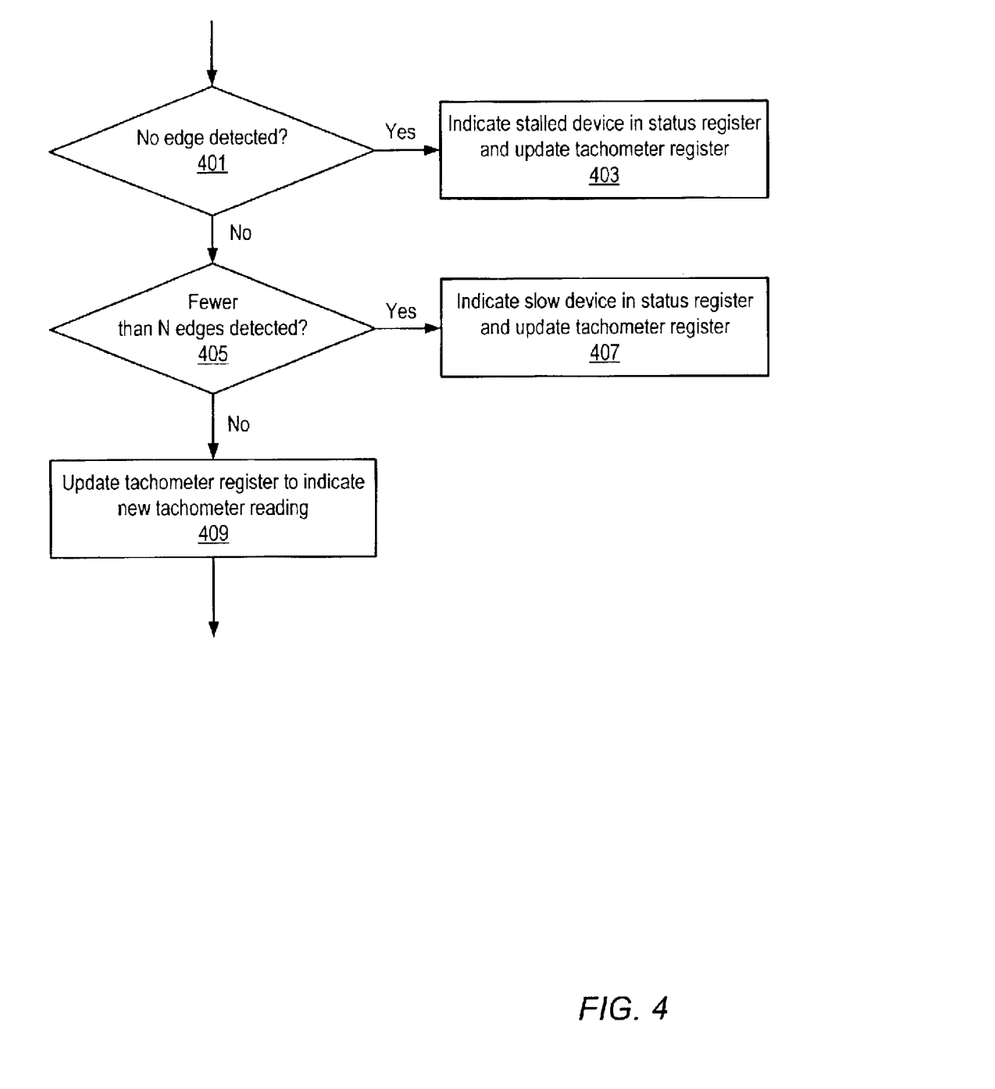
FIG. 4 illustrates how a tachometer reading unit may update status and tachometer registers in response to having taken a tachometer reading while performing PWM stretching.

FIG. 4 illustrates how a tachometer reading unit may update status and tachometer registers in response to having taken a tachometer reading while performing PWM stretching. If no edges were detected in the tachometer reading for the duration of the stretched PWM pulse, the status register may be updated to indicate that the device is stalled, as indicated at 401 and 403. Additionally, the tachometer register may be updated to reflect either a value obtained based on the incomplete tachometer reading or to a value (e.g., FFh) indicating that the device is stalled. In some embodiments, the choice of whether to store a value indicative of an actual reading or a value indicative of a stalled fan in this situation may be programmable.

If at least one edge but fewer than N edges (the number of edges desired to obtain a tachometer reading) were detected during the stretched PWM pulse, the status register may be updated to indicate that the device is slow, as indicated at 405 and 407. Additionally, the tachometer register may be updated according to reading obtained from the fewer than N edges of the tachometer signal. Alternatively, the tachometer register may be updated with a value (e.g., FEh) indicating that the device is slow. In some embodiments, the choice of whether to store a value indicative of an actual reading or a value indicative of a slow fan in this situation may be programmable.

If N edges are detected within the tachometer signal, the tachometer register may be updated to indicate the tachometer reading obtained from those N edges, as indicated at 409. For example, if a counter is used to count clock pulses that occur between N tachometer edges, the tachometer register may be updated with the count (or with a value derived from that count). The status register may also be updated to indicate that the device is operating normally.

Numerous variations and modifications will become apparent to those skilled in the art once the above disclosure is fully appreciated. It is intended that the following claims be interpreted to embrace all such variations and modifications.

What is claimed is:

1. A system, comprising:
   a PWM (Pulse Width Modulated) signal generator configured to generate a PWM signal; and
   a tachometer reading unit coupled to the PWM generator and configured to obtain a tachometer reading from a tachometer signal generated by a device powered by the PWM signal, wherein the tachometer reading unit includes a register configured to store a value indicative of a maximum stretching duration;
   wherein the tachometer reading unit is configured to control the PWM signal generator to stretch a pulse in the PWM signal, wherein the tachometer reading unit is configured to not stretch the pulse longer than the maximum stretching duration indicated by the register;
   wherein the tachometer reading unit is configured to obtain the tachometer reading during the stretched pulse in the PWM signal;
   wherein the tachometer reading unit is configured to update the register in response to receiving a new value of the maximum stretching duration.

2. The system of claim 1, wherein the tachometer reading unit is configured to control the PWM signal generator to stretch the pulse in the PWM signal until the earliest of: detection of N edges in the tachometer signal or expiration of the maximum stretching duration.

3. The system of claim 2, wherein the tachometer reading unit is configured to update a value of N in response to receiving a new value of N.

4. The system of claim 2, wherein the tachometer reading unit is configured to detect the speed of the device by counting clock pulses between particular ones of the N edges in the tachometer signal.

5. The system of claim 1, wherein the PWM signal generator and the tachometer reading unit are included in an integrated circuit.

6. The system of claim 1, wherein in response to the PWM signal transitioning to a signal level that powers the device, the tachometer reading unit is configured to wait for a guard time to expire before detecting an edge in the tachometer signal.

7. The system of claim 6, wherein the tachometer reading unit is configured to update a value of the guard time in response to receiving a new value of the guard time.

8. The system of claim 6, wherein the tachometer reading unit is configured to ignore the first X edges in the tachometer signal after expiration of the guard time, and wherein the tachometer reading unit is configured to obtain the tachometer reading by detecting N edges in the tachometer signal subsequent to detecting the first X edges in the tachometer signal.

9. The system of claim 1, wherein the tachometer reading unit is configured to operate in one mode if the device is constantly powered and to operate in a different mode if the device is powered by the PWM signal and the PWM signal has a duty cycle less than 100%.

10. The system of claim 9, wherein when in the different mode, the tachometer reading unit is configured to not detect edges in the tachometer signal while the device is not powered.

11. The system of claim 1, wherein the tachometer reading unit is configured to stretch the pulse in the PWM signal in response to the tachometer reading unit detecting fewer than N edges of the tachometer signal during an un-stretched pulse in the PWM signal.

12. The system of claim 1, wherein if the maximum stretching duration expires before the tachometer reading unit detects any edges in the tachometer signal, the tachometer reading unit is configured to update a status register to indicate that the device is stalled.

13. The system of claim 1, wherein if the maximum stretching duration expires after the tachometer reading unit detects at least one edge in the tachometer signal but before the tachometer reading unit detects N edges in the tachometer signal, the tachometer reading unit is configured to update a status register to indicate that the device is slow.

14. The system of claim 1, wherein if PWM stretching is disabled, the tachometer reading unit is configured to not stretch the pulse in the PWM signal, wherein the tachometer reading unit is configured to update a PWM stretching register to indicate that PWM stretching is enabled in response to receiving a new value of the PWM stretching register.

15. A method, comprising:
   storing a value indicative of a maximum stretching duration;

generating a PWM signal to power a device;

stretching a pulse in the PWM signal, wherein said stretching ends if the maximum stretching duration indicated by the value elapses;

in response to said stretching, obtaining a tachometer reading from a tachometer signal generated by the device;

updating the value to indicate a new maximum stretching duration.

16. The method of claim 15, wherein said stretching comprises stretching the pulse in the PWM signal until the earliest of: detection of N edges in the tachometer signal or expiration of the maximum stretching duration.

17. The method of claim 16, further comprising updating a register storing a value of N in response to receiving a new value of N.

18. The method of claim 16, further comprising detecting the speed of the device by counting clock pulses between particular ones of the N edges in the tachometer signal.

19. The method of claim 16, further comprising:

in response to the PWM signal transitioning to a signal level that powers the device, waiting for a guard time to expire before detecting any of the N edges in the tachometer signal.

20. The method of claim 19, further comprising updating a register storing a value of the guard time in response to receiving a new value of the guard time.

21. The method of claim 19, further comprising:

ignoring the first X edges in the tachometer signal after expiration of the guard time; and updating the tachometer register in response to detecting N edges in the tachometer signal subsequent to detecting the first X edges in the tachometer signal.

22. The method of claim 15, further comprising circuitry for performing said stretching and said updating the tachometer register operating in one mode if the device is constantly powered and operating in a different mode if the device is powered by the PWM signal and the PWM signal has a duty cycle less than 100%.

23. The method of claim 22, further comprising the circuitry not detecting edges in the tachometer signal while the device is not powered if the circuitry is in the different mode.

24. The method of claim 15, further comprising stretching the pulse in the PWM signal in response to detecting fewer than N edges of the tachometer signal during an un-stretched pulse in the PWM signal.

25. The method of claim 15, further comprising update a status register to indicate that the device is stalled if the maximum stretching duration expires before any edges in the tachometer signal are detected.

26. The method of claim 15, further comprising update a status register to indicate that the device is slow if the maximum stretching duration expires after detection of at least one edge in the tachometer signal but before detection of N edges in the tachometer signal.

27. The method of claim 15, further comprising not stretching the pulse in the PWM signal if PWM stretching is disabled and updating a PWM stretching register to indicate that PWM stretching is enabled in response to receiving a new value of the PWM stretching register.

* * * * *